(No Model.) 3 Sheets—Sheet 1.
F. KAUCHER.
GRAIN ELEVATOR.
No. 528,230. Patented Oct. 30, 1894.
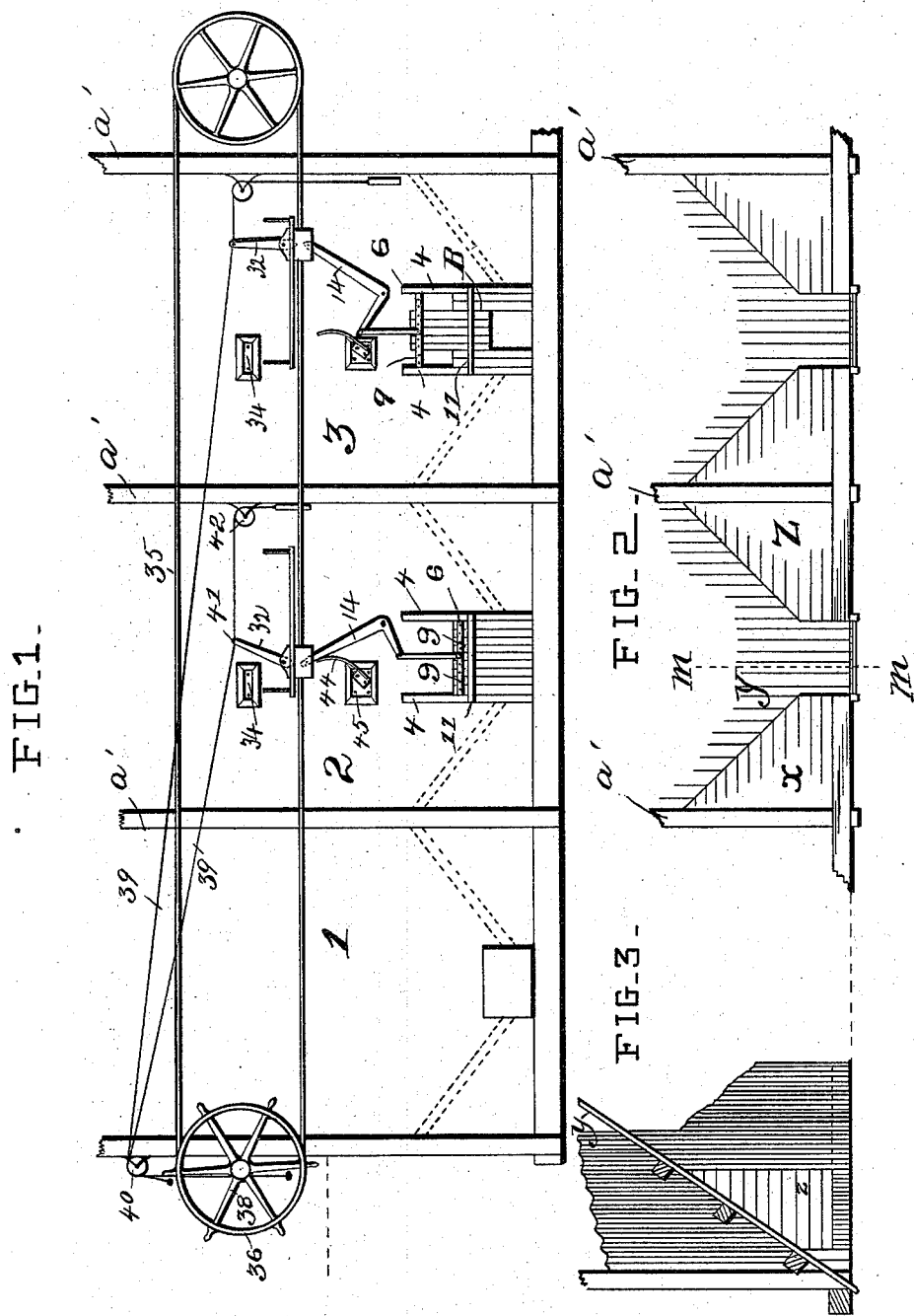
Witnesses
R. W. Johnson
Jas. W. Graham
Frank Kaucher, Inventor,
By his Attorneys John J. Halsted & Son.

(No Model.) 3 Sheets—Sheet 2.
F. KAUCHER.
GRAIN ELEVATOR.
No. 528,230. Patented Oct. 30, 1894.
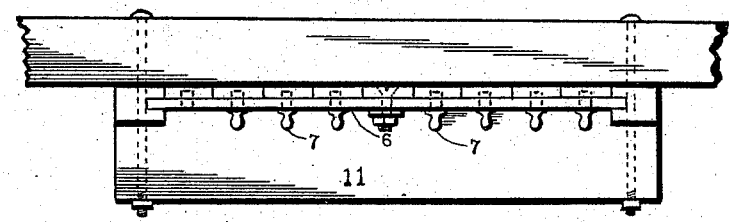
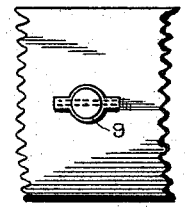
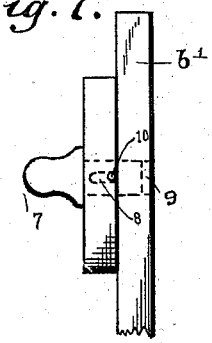
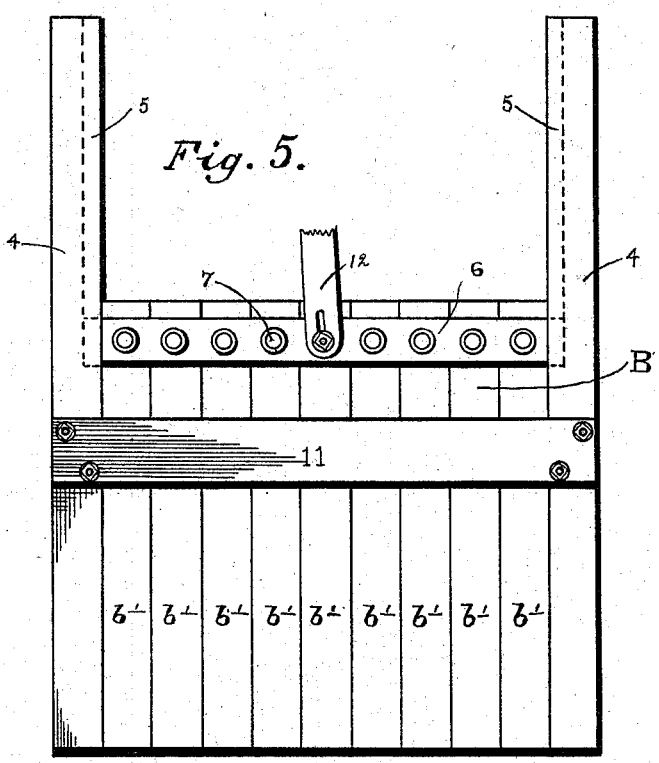

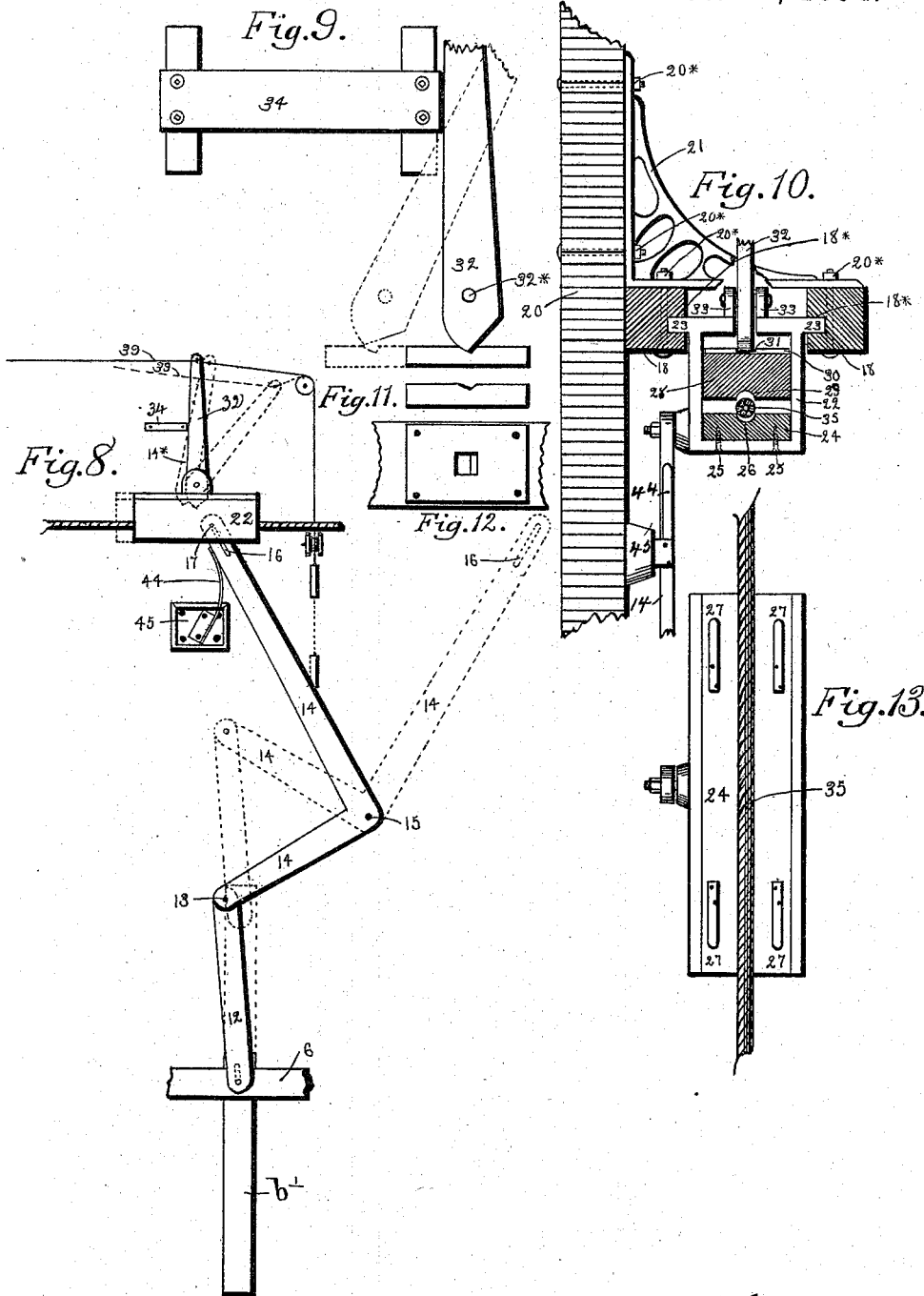

UNITED STATES PATENT OFFICE.

FRANK KAUCHER, OF ST. JOSEPH, MISSOURI.

GRAIN-ELEVATOR.

SPECIFICATION forming part of Letters Patent No. 528,230, dated October 30, 1894.

Application filed January 3, 1894. Serial No. 495,554. (No model.)

*To all whom it may concern:*

Be it known that I, FRANK KAUCHER, of St. Joseph, in the county of Buchanan and State of Missouri, have invented certain new and useful Improvements in Grain-Elevators; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to that class of devices used for operating the bins of grain elevators, so as to regulate and control the discharge of grain from such bins.

The main objects of the invention are, that the operator may operate and control, at once, as many different bins as may be connected with the operating table; that he may operate them all at one time, or only one at a time, or as many as may be desired; that the percentage of grain allowed to discharge from each bin, may be determined and gaged, so that the product may consist of a certain percentage of grain from each of as many bins as may be connected.

In the drawings, Figure 1 is a front elevation of an apparatus serving to illustrate my invention; and showing three bins, two of which are shown as provided with my novel devices; Fig. 2, a detail, showing a plan view of two of the bins in Fig. 1, to illustrate the manner of hoppering, &c. Fig. 3. is a vertical sectional view through the line *m. m.* of Fig. 2; Fig. 4, a plan, enlarged, of the top of one of the discharge gates; Fig. 5, a detail, enlarged, showing an elevation of the discharge gates, and parts adjacent thereto. Fig. 6, a rear detail view of part of the lifting bar, showing in dotted lines, the position of a detaining pin of a stud or knob; Fig. 7, a sectional elevation of one of said knobs or studs, and of its adjacent parts; Fig. 8, a detail, enlarged, showing one of the grip boxes, with the grip in action, and parts adjacent thereto; Fig. 9, a detail, enlarged, partly in section, showing the position of the grip lever when out of action; and an adjacent block on the outside of the wall of each of the bins, to regulate or limit the action of such lever; Fig. 10, a sectional view, enlarged, of one of the grip boxes, showing the bed-plate, cable-grip plate, slide ways, and pivoted grip levers; also the upper part of the two-armed lever which connects the pitman or connecting bar with a grip box; Fig. 11, a side view detached; Fig. 12, a plan view, of the metal plate which is secured on the surface of the grip block, and showing the notch to receive the end of the grip-lever, as more fully shown in Fig. 8; and Fig. 13, a plan, still further enlarged, of the lower grip block, its tongue springs on its upper surface, and also a section of the cable.

All the figures are on a scale larger than that of Fig. 1 and some on a scale much larger than others.

The structure is intended to consist of any number of bins of any required size. I have illustrated three of them, marked 1. 2. and 3., of which two are shown as having my special improved construction. These bins are hoppered, or inclined on three sides, *x. y. z.*, and have a peculiar construction on the fourth or front side, and through which front they may discharge in any desired relative quantities or proportions. These bins may be of any desired dimensions, and any number required may be operated at the same time. They may be constructed of any proper material, though such bins are generally and preferably constructed of wood. They are divided from each other by partitions, *a'*, of any proper material, and (see Figs. 3 and 4) are hoppered or inclined on three sides; the hoppering or inclination of the rear side extending entirely to the front of each bin, and that of the other sides joining the hoppering of the rear side in the usual and well known method, not necessary to be further described or shown.

The front of each bin, instead of being inclined, is vertical, the effect of which is, that the natural point of discharge induced by the weight of the grain in the bin, instead of being in the center of the bottom of such bin is at one (the front) side, through a discharge gate B: and the effect is to throw the weight of most of the grain in the bin directly against the discharge gate, thus facilitating its egress, and leaving no horizontal ledges on which grain can be accumulated.

B is this discharge gate, which is constructed as follows: Two vertical side posts 4, are set in the front wall of said bin, and the upper half of each of said guide posts 4 is provided on its inner surface with a groove (see dotted lines 5 in Fig. 5) extending to the top of said guide posts. Said discharge gate B is provided with and divided into nine equal parts or slats $b'$. (See more particularly Fig. 5, also No. 3 of Fig. 1, which show five of the slats raised.) The purpose of this is to enable the operator to allow the discharge from any bin of a certain percentage of its contents, at the same time that a certain percentage of the contents of another bin of the same series or battery, is being discharged; and so grade the aggregate product of all of the bins under his control. Suppose for instance, that bins two and three (2 and 3) in Fig. 1, are filled with different grades of grain, whether corn, wheat, oats, or any other cereal, and it is desired to produce a grade composed of, we will say, two-thirds of the grain in No. 3, and one-third of the grain in No. 2. To accomplish this purpose, it would be necessary simply to simultaneously draw six of the slats in No. 3 and three of the slats of No. 2 and so on, depending upon the number of bins in the battery.

The gate B is provided with a lifting connecting bar 6, which is placed across the upper ends of the slats above mentioned, in such a manner that its two ends have bearings in the posts 4, so that it may move up and down freely therein.

The connecting bar 6, is arranged with reference to the upright slats in the discharge gate, as follows, (see now especially Figs. 4, 6, and 7:) 7. 7. are removable knobs having slotted shanks 8, passing through perforations 9 in the connecting bar 6, and which perforations are continued partially through the upper ends of the slats corresponding thereto, as seen in Figs. 4 and 6.

The shank 8, of the knob 7, is provided with a slotted opening, through which a retaining pin 10, may be passed to hold said knob in place, and making connection with connecting bar 6, in such manner (see Fig. 6) that, while the knob 7 may be withdrawn, so as to clear and leave free its corresponding slat, it will yet retain its position in the connecting bar 6.

When it is desired to connect said bar with any of the vertical slats of the discharge gate so as to draw or raise the same, the knob 7, is pushed in so that its shank enters the perforation in the top of such slat, thus connecting the two together and it will be seen that when the connection bar is raised, all of the slats connected with it, as above set forth, will be raised and lowered at the same time.

11. is a retaining bar, which is strongly bolted to the post 4. on the outside of the discharge gate B (as shown more fully in Figs. 4 and 5) giving the whole solidity.

A pitman or connecting rod 12. is pivotally attached by means of a slotted opening at its lower end, to the center of the connecting bar 6. Said pitman, or connecting bar 12, is in turn pivotally attached at 13 with a two-armed lever 14, which is itself, fulcrumed at 15 to the outer surface of the front wall of said bin. The upper end of said two-armed lever 14, is pivotally attached by means of a slot and stud 17, to a sliding grip-box hereinafter described.

Referring now more particularly to Figs. 8, 9, 10, 11, and 12: the guide bars 18 are rigidly attached to the cribbing or outer wall 20, of said bin, by means of brackets 21, at each end thereof, and bolts 20*, passing horizontally through said cribbing and brackets, and vertically through said brackets and guide bars 18, thus binding the guide bars (and cribbing) firmly together. As the brackets 21 are placed at each end of the guide bars, it will be seen that an open space has been left between them. This is done to allow play to the sliding grip box, presently to be described. The guide bars 18 are provided with horizontal slots or grooves 18*, running from one end to the other of said guide bars, and adapted to receive the flanges 23 of the sliding grip box 22, and to form a bearing therefor. This sliding or movable grip box is constructed of any suitable metal and any suitable form, giving the proper and necessary solidity. It is made of metal, and is furnished with horizontal flanges 23, (see Fig. 9) adapted to move freely back and forth in the slots and grooves 18*, and it is constructed as follows: A bed-plate 24, is attached to its bottom by means of set screws 25. The upper surface of this bed-plate is provided with a semi-circular groove 26, adapted to receive the lower half of the operating cable 35, hereinafter described. Said bed-plate is also provided with, preferably, four flat springs, 27 (see Fig. 13), one end of each of which is fixedly attached to the upper surface of the bed-plate 24, in such manner, and at such an angle, that when the pressure on the grip block (hereinafter described) is released, said springs 27 will operate to throw said grip block up and out of clutch with said cable, thereby releasing the same. An upper, or grip block 28, is provided, fitting loosely in said grip-box, the bottom of which is furnished with a semi-circular groove 29 corresponding to the groove 26. These two grooves 26 and 29 are so constructed, that when the grip block 28 is thrown down and brought in contact with the bed-plate 24, the opening formed by the grooves 26 and 29 will be of less diameter than the cable upon which they are to operate, and will hence, constitute the clutch by means of which the grip box may be moved forward and backward in the guide bars 18. A metal plate 30, containing a notch 31, is let into the upper surface of the grip block 28, in any proper manner, serving as a base and bearing for a grip lever 32, which is pivoted at 32*, near its lower end, in lugs, or ears 33, attached to, and being integral with the grip box 22. A check or stop block 34, is bolted to the front of each bin in such manner as to serve as a check to the lever 32, as hereinafter described. An endless cable of wire or other proper material passes around sheave wheels, one of which, 36, is provided with spokes or levers 38, radiating from its hub, and protruding beyond the periphery of said wheel. By means of these spokes or levers, the wheel is turned in any direction, carrying with it the cable 35. For each bin, a cord 39 is provided, one end of which passes over a pulley, 40. Said cord is fastened to the upper end of the lever 32, as shown at 41, and then passes over another pulley 42, and at its other end it is provided with a counter weight 43. A check spring 44 is attached to the front wall of each bin, or to a projection or bracket 45 thereon, and it is adapted to act upon the upper arm of lever 14, as hereinafter mentioned.

The mode of operation is as follows, premising that the description of the mechanism of one bin applies to all: Let us suppose that bins marked 2. and 3. are each filled with grain, but of different grades, and it is desired to obtain therefrom a grade composed of one-third of the grain in bin 2. and two-thirds of the grain in bin 3. The operator will connect the lifting bar 6, of bin 2, by means of the knobs 7, with three of the vertical divisions of the discharge gate, and will connect, in like manner, with six of the vertical divisions of the discharge gate of bin 3. Then by pulling down on the cord 39, the lever 32, will be brought to a vertical position, and its upper end then being in contact with the check block 34, as seen in Figs. 8 and 9. The result of this action is to throw the lower end of lever 32 into the notch 31 of the plate 30, and force down the grip block 38 so as to clutch firmly the cable 35. The same action will apply to bin 3. The spoked wheel 36, is then turned to the left, and the lower part of the cable 35 thereby carried to the right, taking with it the grip box 22, which moves freely in the grooves 18*. The two-armed lever 14 is turned on its fulcrum 15, its upper arm by means of the slot 16, and stud 17, describing an arc of a circle, and following the grip box, while its lower arm will be raised, carrying with it the pitman 12, the lifting or connecting bar 6, and such of the vertical divisions of the gate as may have been connected with it; thus opening said gate for the discharge of the contents of its bin, in proportion to the size of such opening. When this action is completed, the positions of the pitman 12, and of the lever 14 will be as shown by the dotted lines in Fig. 8, and the position of said grip box 22, and its attachments will be as shown in bin 3. of Fig. 1; the lever 32 remaining in a vertical position, and maintaining the grip of the cable 35. It will be understood that this action is simultaneous as to all the bins in connection. When it is desired to close said discharge gates, the wheel 36, is turned to the right, the cable 35 acting inversely on the grip boxes 22, and their attachments, throwing them to the left, and closing the vertical slides of the discharge gates. In case, in reversing, the grip boxes 22 should be carried beyond their normal position, as shown by the dotted lines 14*, in Fig. 8, the spring 44, acting upon the upper arm of the lever 14, counteracts such motion, and the grip on the cable being released by dropping the counter-weight 43, and throwing the lever 32, down or out of action, this spring forces back the grip box 22, until the tension of said spring is released and the grip box in position for renewed action.

I claim—

1. In grain elevators or apparatus for mixing grains, a series of bins each made with three inclined sides or floors and with a vertical front side, such front having a throat or discharge outlet therein provided with a vertical gate composed of a series of slats, severally adapted to be raised at will, and thereby serving to open and close to the required degree the discharge opening in such front side.

2. In apparatus for regulating and controlling the discharge of grain from bins, the combination with a bin having a vertical front and having its bottom inclined from two sides toward each other, and from its back down to its vertical front, a front discharging gate, composed of a series of vertical slats, severally detachable from their lifting bar, and whereby the size of the discharge outlet may be varied at will to control the amount of grain discharged from the bin.

3. In combination with a front discharging bin, a vertical gate for opening and closing its discharging outlet, composed of a series of slats severally attachable to and detachable from a connecting bar, and devices for lifting such bar, and its attached slats.

4. In combination with a bin having its discharge outlet at its front, and provided with a vertical gate composed of a bar having a series of slats attachable thereto at will, as described, a pivoted connecting rod for lifting and lowering said bar, and its attached slats; a two-armed slotted lever for actuating such rod, a traveling grip-box, and an endless cable for actuating said box and the gate.

5. In grain elevators or apparatus for mixing grains, a series of bins in combination with the endless cable, the grip box for gripping the same, provided with a notched plate 30, lever 32, fixed stop block 34, and a weighted cord 39, all substantially as set forth.

6. In grain elevators or apparatus for mixing grains, a series of bins in combination with the grooved guide bars, the sliding grip box having flanges running in said grooves, the fixed grooved bed-plate and its surface springs, and the grooved grip block, and means, substantially as described for actuating such block.

7. In combination with a bin having its discharging mouth at its front, the described gate for governing the amount of grain to be discharged, consisting of a series of vertically movable slats; a bar for connecting the same, a movable pin for effecting the engagement, or disengagement of each slat with such bar, and guide posts to guide the rising and falling of the gate, with its attached slats.

FRANK KAUCHER.

Witnesses:
M. I. HUMISTON,
W. L. BUECHLE.